Oct. 31, 1950  J. A. JENSEN  2,528,369
PIPE OR CONDUIT COUPLING
Filed Aug. 22, 1946  2 Sheets-Sheet 1
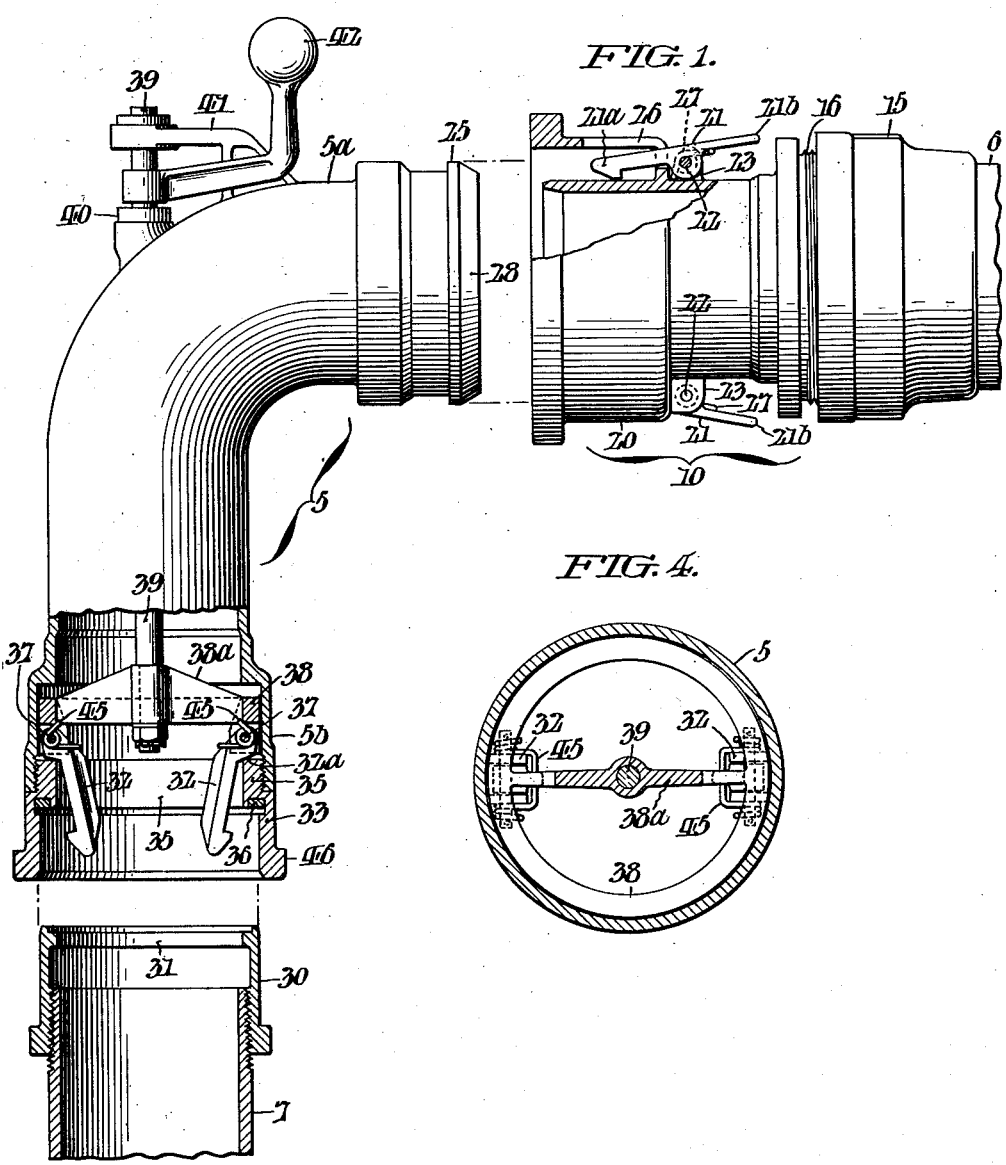
WITNESSES
Thomas W. Kerr, Jr.
George L. Comly
INVENTOR:
James A. Jensen,
BY Paul & Paul
ATTORNEYS.

Oct. 31, 1950 J. A. JENSEN 2,528,369
PIPE OR CONDUIT COUPLING
Filed Aug. 22, 1946 2 Sheets-Sheet 2
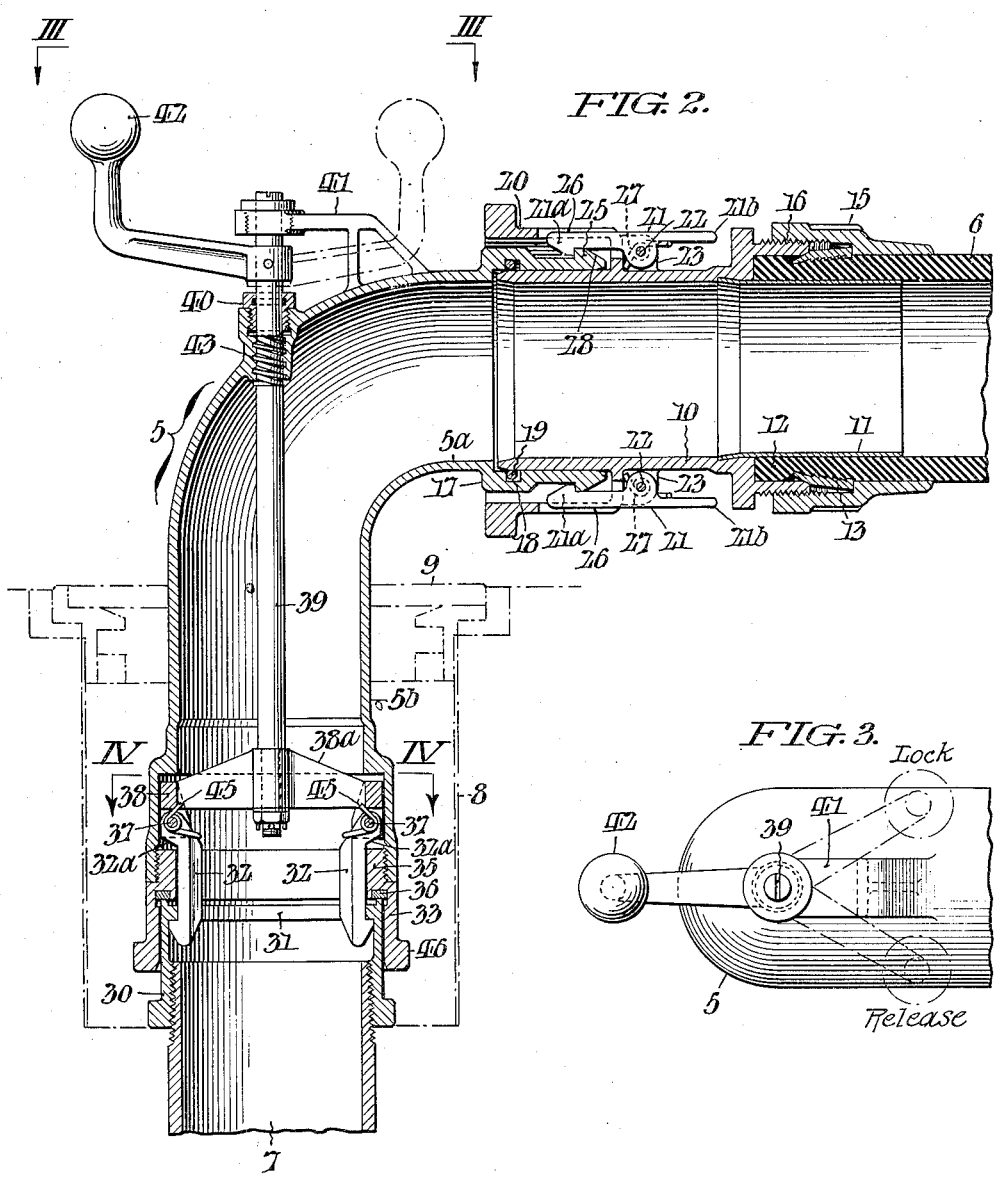
WITNESSES
Thomas W. Kerr, Jr.
George L. Comly
INVENTOR:
James A. Jensen,
BY Paul & Paul
ATTORNEYS.

Patented Oct. 31, 1950

2,528,369

UNITED STATES PATENT OFFICE 2,528,369

PIPE OR CONDUIT COUPLING

James A. Jensen, Haverford, Pa., assignor to Philadelphia Valve Company, Philadelphia, Pa., a copartnership Application August 22, 1946, Serial No. 692,190

5 Claims. (Cl. 285—173)

This invention relates to couplings for connecting conduit or pipe sections end to end, and has reference more particularly to what are generally known as "quick-release" couplings especially useful, for example, in coupling drain hoses of gasoline or oil delivery vehicles to the fill pipes of buried receiving tanks at gas stations, or to tanks buried at or located within buildings where oil is employed for heating or other purposes.

The chief aim of my invention is to provide a coupling of the kind referred to which is of simple, compact and rugged construction, which lends itself readily to economic manufacture in quantity, and which although quickly connectable and detachable, can be relied upon for maintenance of a fluid-tight joint with the pipe or conduit sections between which it is interposed.

Other objects and attendant advantages will appear from the following detailed description of the attached drawings, wherein Fig. 1 is an exploded view, partly in side elevation and partly in section, showing a coupling conveniently embodying my invention and associated parts disconnected.

Fig. 2 is an axial sectional view showing the parts in assembled relation.

Fig. 3 is a fragmentary view in plan looking as indicated by the angled arrows III—III in Fig. 1; and Fig. 4 is a horizontal section taken as indicated by the angled arrows IV—IV in Fig. 2.

Referring more specifically to these drawings, my improved coupling comprises a hollow body 5 in the form of an elbow which, for convenience of exemplification herein, is shown as arranged for connecting of a drain hose 6, such as is ordinarily associated with vehicles used in delivering oil or other liquid commodities, to the end of the fill pipe 7 of a remotely located storage tank (not shown). After customary practice, the fill pipe is surrounded, as indicated in dot and dash lines in Fig. 2, by larger protective tube 8 with a removable top cover 9.

For connection of the coupling to the hose 6, I have devised means including an adapter element 10 whereof the internal diameter corresponds to that of the elbow. At its rear end the adapter 10 has an axial extension 11 which is forced into the end of the hose, and the juncture is made fluid tight through compression of the hose material and of a sealing gasket 12 of rubber or the like by a wedge ring 13 within a nut clamp sleeve 15 threadedly engaged at 16 with said adapter. The inlet end 5a of the elbow 5 is somewhat enlarged as at 17 to telescopically fit rather snugly over the outer end portion of the adapter element 10, and has an internal groove 18 wherein is lodged an annular round section gasket 19 of rubber or the like to slidingly seal with said element. An integrally formed protective hood 20 surrounding the telescoped outer end of the adapter prevents said end from being nicked or otherwise damaged incident to rough or careless handling. The connection here is releasably maintained by a pair of latch members 21 which are independently swingable about pivot pins 22 in clevised lugs 23 externally of the adapter, said members having hook ends 21a for engaging behind a peripheral flange 25 around the mouth of the elbow end 5a. As shown, the protective hood 20 is slotted at 26 for clearance and entry of the hook portions of the latches 21 which latter are biased inwardly by torsion springs indicated at 27. The elbow end 5a is circumferentially beveled as at 28 for capacity to outwardly displace the hook ends of the latches 21 during the coupling, the latter being eventually pressed into latching position by the springs 27 with their hooks engaging behind the shoulder of the flange 25. When the elbow 5 is to be detached from the hose 6, the tail ends 21b of the latches 21 are pressed inwardly by grasping the protruding portion of the adapter 10 in one hand while the coupling is held in the other, with the result that the hook ends 21a of said latches are retracted from the shoulder 25 to permit the separation.

For the purpose of enabling quick connection and disconnection of the elbow to and from the fill pipe 7, I have devised means including an adapter element in the form of a sleeve 30 which is screwed onto the exposed end of the fill pipe 7. As shown, the adapter element 30 has an annular flange projection 31 internally of its top for engagement by hook latches 32 within the mating end 5b of the elbow, the latter being somewhat enlarged as at 33 to telescopically fit over said adapter. The elbow end 5b is likewise formed with an internal flange 35 which provides a shoulder with a compressible inset gasket 36 to abut the top edge of said adapter 30. The latches 32 are pivotally supported for independent swinging movement at 37 by an annulus 38 whereof the cross-bar 38a is swivelly connected to the bottom end of a shaft 39, and provided adjacent their pivots with cam inclines 32a for cooperation with the flange 35 in a manner later on explained. The shaft 39 is axially disposed within the elbow end 5b and passes to the exterior through a stuffing box 40 in the wall of the elbow. The protruding top end of the shaft 39 has rotative bearing in an integral bracket projection 41 on the elbow, and to it is pinned an actuating hand crank 42, whose movements in opposite directions are limited by contact thereof with said bracket projection as shown in dot and dash lines in Fig. 3. At 43, the shaft 39 has a left hand screw engagement with the elbow wall so as to be moved endwise as it is rotated for a purpose presently explained. Torsion springs 45 tend to move the latches 32 to the active position in which they are illustrated in Fig. 2. It is to be noted that the flange 35 is formed on a sleeve 46 screwed into the end 5b of the elbow, this construction being resorted to in order to make possible the insertion of the annulus 38 with its latches 32 into the elbow.

In applying the elbow 5 to the fill pipe 7, its end 5b is first slipped down over the adapter 30 in a manner which will be readily understood from Fig. 1, until the inset gasket 36 on the internal flange 35 rests on the top edge of said adapter. The hand crank 42 is thereupon turned clockwise from the unlatching position in Figs. 1 and 3 to the latching position, when by attendant action of the screw threading at 43, the shaft 39 will be axially moved upward incident to which the latches 32 will be automatically swung outward by the springs 45 and their hook ends passed beneath the internal flange projection 31 of the adapter 30. With continued rotation of the shaft 39, the hook ends of the latches will eventually engage the under side of the flange 31 and cause the elbow 5 to be drawn downward. As a consequence, the gasket 36 will be compressed to seal tightly against the upper end of the adapter 30, and the elbow at the same time be firmly secured in position as shown in Fig. 2. Disconnection of the elbow from the pipe 7 is effected simply by reversing the above procedure, that is to say, the hand crank 42 is turned counter clockwise from lock position to release position in Fig. 3 incident to which, by action of the screw means at 43, the annulus 38 is depressed and the latches 32 swung inwardly away from the internal flange 31 of the adapter 30 by cooperation of their cam inclines 32a with the top of the internal flange 35 of the elbow as shown in Fig. 1.

Having thus described my invention, I claim:

1. A coupling, for a hose or the like, comprising a hollow body in the form of an elbow with one end thereof arranged to be telescopically applied over a pipe or conduit end, and having an annular stop shoulder internally thereof to abut the pipe end; a normally retracted latch means interiorly of the body; and means with an actuating member exteriorly of the body at the turn of the elbow whereby the latch means is operable to engage behind a flange internally of the pipe end to hold the coupling in place.

2. A coupling, for a hose or the like, comprising a hollow body in the form of an elbow with one end thereof arranged to be telescopically applied over a pipe or conduit end, and having an annular stop shoulder internally thereof to abut the pipe end; a normally retracted latch means interiorly of the body; means with an actuating member exteriorly of the body at the turn of the elbow whereby the latch means is operable to engage behind a flange internally of the pipe end to hold the coupling in place; an annular gasket on the interior stop shoulder of the body; and means incorporated in the latch operating means whereby the gasket is compressed to form a fluid tight seal between said shoulder and the flange internally of the pipe end incident to actuation of the latch means in securing the coupling.

3. A coupling according to claim 1, wherein an adapter sleeve on the end of the pipe provides the internal flange for engagement by the latch means.

4. A coupling according to claim 1, wherein the latch means includes a plurality of hook elements with springs tending to move them to latching position; wherein the actuating means includes a shaft which extends axially of the outlet end of the elbow to the exterior and to which the hook elements are pivotally connected at the inner end, said shaft having a threaded engagement with the wall of the elbow and an operating crank means at its external end; and wherein the latch elements are provided with cam surfaces for cooperation with the annular shoulder within the elbow as the shaft is turned and incidently moved endwise by the screw to retract the hook element from engagement with the internal shoulder of the pipe when the elbow is to be disconnected.

5. A coupling for a hose or the like comprising a hollow body with an outlet end adapted to be telescopically applied over a pipe or conduit end; an annular stop shoulder within the outlet end of the coupling; a compressible ring gasket seated in the shoulder for abutting the pipe or conduit end; an annulus guided for axial movement within the outlet of the coupling body; a plurality of normally retracted hook ended latch elements pivotally connected to the annulus; means operable from the exterior of the body for shifting the annulus; and means automatically operative as the annulus is shifted to swing the latches about their pivots to bring their hook ends beneath an internal circumferential flange within the pipe end, and to thereafter draw upon the latches for compression of the gasket and creation of a fluid tight joint between the pipe end and the internal shoulder of the body.

JAMES A. JENSEN.

REFERENCES CITED

The following references are of record in the file of this patent:

UNITED STATES PATENTS

| Number | Name | Date |
| --- | --- | --- |
| 904,036 | Withrow | Nov. 17, 1907 |
| 1,060,442 | Erickson | Apr. 29, 1913 |
| 1,187,553 | Riordan | June 20, 1916 |